United States Patent
Helmick et al.

(10) Patent No.: US 10,649,442 B2
(45) Date of Patent: May 12, 2020

(54) METHODS OF OPERATING AN AUTOMATED MACHINE FOR INSERTING WIRES INTO GROMMET CAVITY LOCATIONS OF AN ELECTRICAL CONNECTOR

(71) Applicant: The Boeing Company, Chicago, IL (US)

(72) Inventors: Eerik J. Helmick, Everett, WA (US); Bradley J. Mitchell, Snohomish, WA (US); Nick S. Evans, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 805 days.

(21) Appl. No.: 15/137,556

(22) Filed: Apr. 25, 2016

(65) Prior Publication Data
US 2017/0308068 A1    Oct. 26, 2017

(51) Int. Cl.
*H01R 43/20* (2006.01)
*B25J 9/16* (2006.01)
(Continued)

(52) U.S. Cl.
CPC ...... *G05B 19/41805* (2013.01); *B25J 9/1687* (2013.01); *H01R 43/20* (2013.01);
(Continued)

(58) Field of Classification Search
CPC ............... G05B 19/41; G05B 2219/39; G05B 19/41805; G05B 2219/39183;
(Continued)

(56) References Cited

U.S. PATENT DOCUMENTS 2,700,140 A * 1/1955 Phillips ................ H01R 13/621
439/274
3,477,061 A * 11/1969 Stephenson .......... H01R 13/502
439/589
(Continued)

FOREIGN PATENT DOCUMENTS

| CN | 101180591 | 5/2008 |
| CN | 203481527 | 3/2014 |
| EP | 2 958 201 | 12/2015 |

OTHER PUBLICATIONS

European Patent Office, Extended European Search Report, App. No. 17154112.1 (dated Sep. 21, 2017).
(Continued)

*Primary Examiner* — Peter Dungba Vo
*Assistant Examiner* — Kaying Kue
(74) *Attorney, Agent, or Firm* — Walters & Wasylyna LLC

(57) ABSTRACT

A method 500 of operating an automated machine 100 is provided for inserting wires into grommet cavity locations 110 of an electrical connector 112 to compensate for manufacturing tolerances associated with the electrical connector. The method comprises inserting wires into grommet cavity locations of the electrical connector based upon a plug map 300 having offset values to compensate for manufacturing tolerances associated with the electrical connector. The method may further comprise selecting from a plurality of pre-generated plug maps having offset values the closest matching pre-generated plug map for the electrical connector based upon offset values associated with each of the plurality of pre-generated plugs maps. The selected pre-generated plug map having offset values corresponds to the plug map used to insert wires into grommet cavity locations of the electrical connector.

20 Claims, 5 Drawing Sheets

(51) Int. Cl.
*G05B 19/418* (2006.01)
*H01R 107/00* (2006.01)

(52) U.S. Cl.
CPC .............. *G05B 2219/39183* (2013.01); *G05B 2219/45033* (2013.01); *G05B 2219/45064* (2013.01); *H01R 2107/00* (2013.01); *Y10S 901/02* (2013.01)

(58) Field of Classification Search
CPC . G05B 2219/45033; G05B 2219/45064; B25J 19/16; B25J 9/1687; Y10T 29/49204–49224; H01R 12/585; H01R 12/00–585; H01R 2107/00; H01R 43/20; Y10S 901/02; H05K 3/40; H01L 21/56; H01L 21/302
USPC ............ 700/108; 29/748, 749–754, 874–885
See application file for complete search history.

(56) References Cited

U.S. PATENT DOCUMENTS

| | | | | |
|---|---|---|---|---|
| 3,667,101 A * | 6/1972 | Kloth | ............ | H01R 13/432 29/749 |
| 4,727,637 A * | 3/1988 | Buckwitz | ............ | H01R 43/20 29/407.04 |
| 4,890,382 A * | 1/1990 | Anderson | ............ | H01R 43/20 29/721 |
| 4,936,011 A * | 6/1990 | Berry | ............ | H01R 43/20 29/748 |
| 5,198,983 A | 3/1993 | Blake et al. | | |
| 5,315,757 A | 5/1994 | Koch et al. | | |
| 5,989,065 A * | 11/1999 | Lazaro, Jr. | ............ | H01R 9/032 439/589 |
| 6,793,401 B2 * | 9/2004 | Daniel | ............ | G02B 6/3885 29/721 |
| 7,406,764 B2 * | 8/2008 | Takayama | ............ | H01R 43/0486 29/33 F |
| 7,661,980 B2 * | 2/2010 | Dietrich | ............ | H01R 9/03 439/460 |
| 9,263,840 B1 * | 2/2016 | Lazaro, Jr. | ............ | G01L 5/0042 |
| 9,300,104 B1 * | 3/2016 | Lazaro, Jr. | ............ | H01R 43/22 |
| 9,315,342 B1 | 4/2016 | Mitchell et al. | | |
| 10,109,974 B2 * | 10/2018 | Helmick | ............ | H01R 43/20 |
| 2003/0100228 A1 * | 5/2003 | Bungo | ............ | B23K 20/10 439/701 |
| 2004/0037508 A1 * | 2/2004 | Daniel | ............ | G02B 6/3885 385/54 |
| 2007/0006449 A1 * | 1/2007 | Yamanashi | ............ | H01R 13/4362 29/748 |
| 2010/0331658 A1 * | 12/2010 | Kim | ............ | A61B 18/18 600/373 |
| 2012/0304439 A1 | 12/2012 | Larisch | | |
| 2014/0041215 A1 * | 2/2014 | Barns | ............ | H01R 43/26 29/842 |
| 2014/0187089 A1 * | 7/2014 | Buck | ............ | H01R 13/719 439/620.01 |
| 2016/0335800 A1 * | 11/2016 | DeStories | ............ | G06F 3/04883 |
| 2017/0070021 A1 | 3/2017 | Helmick | | |
| 2017/0133809 A1 * | 5/2017 | Larisch | ............ | H01R 43/20 |
| 2017/0222387 A1 | 8/2017 | Helmick et al. | | |

OTHER PUBLICATIONS

China National Intellectual Property Administration, Office Action, with English translation, App. No. 201710164029.7 (dated Dec. 17, 2019).

* cited by examiner

METHODS OF OPERATING AN AUTOMATED MACHINE FOR INSERTING WIRES INTO GROMMET CAVITY LOCATIONS OF AN ELECTRICAL CONNECTOR

FIELD

The present application relates to wire insertion machines, and is particularly directed to methods of operating an automated machine for inserting wires into grommet cavity locations of an electrical connector and an automated wire insertion machine.

BACKGROUND

A typical wire insertion machine includes a robot that inserts wires into grommet cavity locations of an electrical connector. The electrical connector is mounted on a mounting fixture that is firmly affixed to a base of the wire insertion machine. The wire insertion machine also includes a processing unit that controls the robot to insert wires in accordance with a plug map and program instructions stored in a data storage unit. The plug map comprises spatial coordinates at which the robot is to insert wires into grommet cavity locations of the electrical connector.

A drawback in the operation of the above-described wire insertion machine is that one or more spatial coordinates at which the robot is to insert wires may not align sufficiently with the corresponding true grommet cavity locations of the electrical connector to ensure successful wire insertions. A failed wire insertion occurs when spatial coordinates at which the wire is to be inserted do not align sufficiently with the corresponding true grommet cavity location. It would be desirable to overcome such drawbacks in the operation of wire insertion machines.

SUMMARY

In one aspect, a method of operating an automated machine is provided for inserting wires into grommet cavity locations of an electrical connector to compensate for manufacturing tolerances associated with the electrical connector. The method comprises inserting wires into grommet cavity locations of the electrical connector based upon a plug map having offset values to compensate for manufacturing tolerances associated with the electrical connector.

In another aspect, a method of operating an automated machine is provided for inserting wires into grommet cavity locations of an electrical connector to compensate for manufacturing tolerances associated with the electrical connector. The method comprises storing in a data storage unit a plurality of pre-generated plug maps associated with the electrical connector. The method further comprises retrieving from the data storage unit one of the plurality of pre-generated plug maps. The method also comprises inserting wires into grommet cavity locations of the electrical connector based upon the retrieved one of the plurality of pre-generated plug maps to compensate for manufacturing tolerances associated with the electrical connector.

In another aspect, a method of operating an automated machine is provided for inserting wires into grommet cavity locations of an electrical connector to compensate for manufacturing tolerances associated with the electrical connector. The method comprises storing in a data storage unit local to the automated wire insertion machine an original plug map associated with the electrical connector. The method further comprises receiving offset values from a source external to the automated wire insertion machine. The method further comprises calculating an updated plug map based upon the original plug map and the offset values. The method also comprises inserting wires into grommet cavity locations of the electrical connector based upon the updated plug map to compensate for manufacturing tolerances associated with the electrical connector.

In yet another aspect, an automated wire insertion machine is provided for inserting wires into grommet cavity locations of an electrical connector. The automated wire insertion machine comprises a controllable wire insertion robot, and a processing unit configured to control the wire insertion robot based upon a plug map having offset values to insert wires into the grommet cavity locations of the electrical connector.

Other aspects will become apparent from the following detailed description, the accompanying drawings and the appended claims.

DETAILED DESCRIPTION

The present application is directed to methods of operating an automation machine for inserting wires into an electrical connector. The specific construction of the automated wire insertion machine and the industry in which the machine is implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes an automated wire insertion machine and methods implemented by the Boeing Corporation for insertion of wires in electrical connectors for airplane parts in compliance with Federal Aviation Administration (FAA) regulations.

Figure 1:
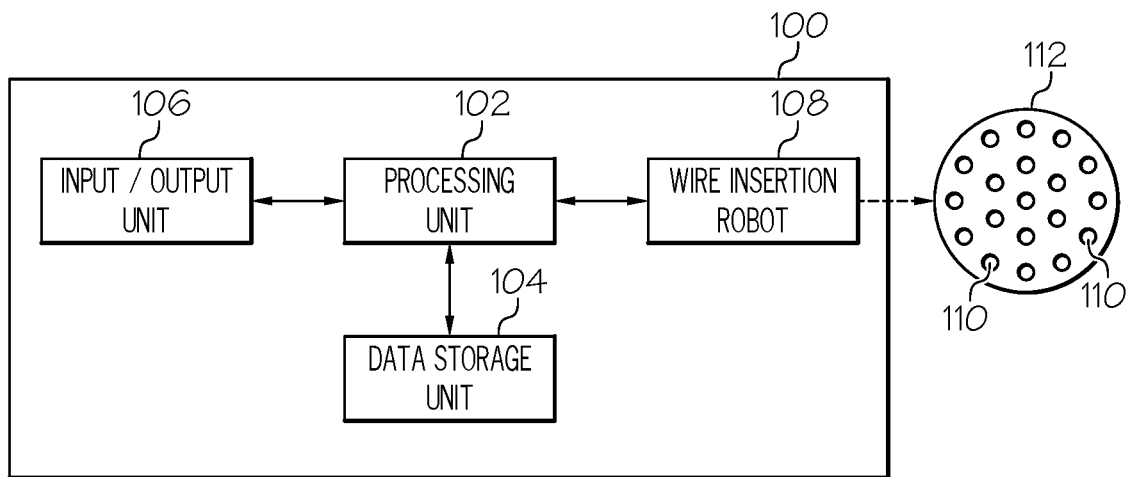
FIG. 1 is a block diagram of an example automated wire insertion machine constructed in accordance with an embodiment.

Referring to FIG. 1, a block diagram of an example automated wire insertion machine 100 constructed in accordance with an embodiment is illustrated. An existing model of a wire insertion machine can be modified to provide automated wire insertion machine 100. For example, model Komax Zeta 656 manufactured by Komax located in Switzerland can be modified to provide automated wire insertion machine 100. Modifications of other models of wire insertion machines are possible.

Automated wire insertion machine 100 includes processing unit 102 that executes instructions stored in internal data storage unit 104, external data storage unit (not shown), or a combination thereof. Processing unit 102 may comprise any type of technology. For example, processing unit 102 may comprise a dedicated-purpose electronic processor. Other types of processors and processing unit technologies are possible. Internal data storage unit 104 may comprise any type of technology. For examples, internal data storage unit 104 may comprise random access memory (RAM), read only memory (ROM), solid state memory, or any combination thereof. Other types of memories and data storage unit technologies are possible.

Automated wire insertion machine 100 further includes a number of input/output (I/O) devices 106 that may comprise any type of technology. For example, I/O devices 106 may comprise a keypad, a keyboard, a touch-sensitive display screen, a liquid crystal display (LCD) screen, a microphone, a speaker, or any combination thereof. Other types of I/O devices and technologies are possible.

Automated wire insertion machine 100 further includes wire insertion robot 108 that is controlled in response to signals from processing unit 102. More specifically, processing unit 102 executes instructions of a wire insertion application program stored in data storage unit 104 to control operation of wire insertion robot 108 to insert wires into grommet cavity locations 110 of electrical connector 112 shown in FIG. 1. Electrical connector 112 may comprise a MIL-spec type of electrical connector, and is mounted on a fixture of automated wire insertion machine 100. Structure and operation of wire insertion robots are known and, therefore, will not be further described.

Figure 2:
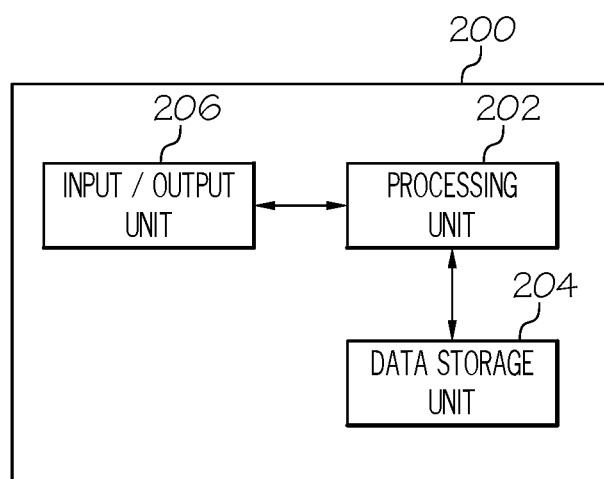
FIG. 2 shows an example computer system external to the automated wire insertion machine of FIG. 1 and capable of providing a plug map having offset values for use in the automated wire insertion machine.

Referring to FIG. 2, an example computer system 200 external to automated wire insertion machine 100 of FIG. 1 and capable of providing a plug map having offset values (as will be described in more detail hereinbelow with reference to FIG. 3) for use in automated wire insertion machine 100 is illustrated. Computer system 200 includes processing unit 202 that executes instructions stored in internal data storage unit 204, external data storage unit (not shown), or a combination thereof. Processing unit 202 may comprise any type of technology. For example, processing unit 202 may comprise a general-purpose electronic processor. Other types of processors and processing unit technologies are possible. Internal data storage unit 204 may comprise any type of technology. For examples, internal data storage unit 204 may comprise random access memory (RAM), read only memory (ROM), solid state memory, or any combination thereof. Other types of memories and data storage unit technologies are possible.

Computer system 200 further includes a number of input/output (I/O) devices 206 that may comprise any type of technology. For example, I/O devices 206 may comprise a keypad, a keyboard, a touch-sensitive display screen, a liquid crystal display (LCD) screen, a microphone, a speaker, or any combination thereof. Other types of I/O devices and technologies are possible.

Figure 3:
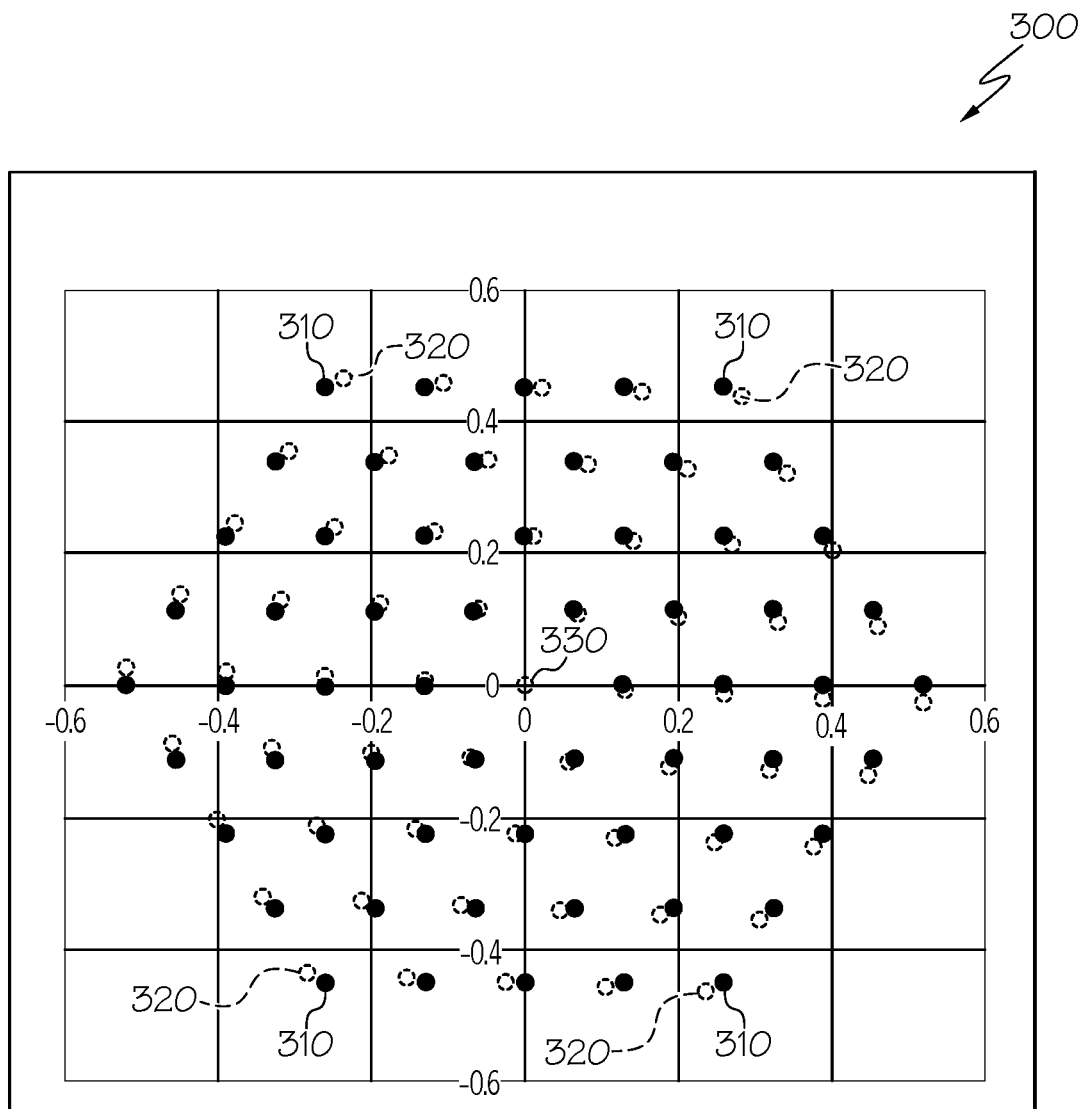
FIG. 3 shows an example plug map having offset values for use in the automated wire insertion machine of FIG. 1.

Referring to FIG. 3, an example plug map 300 having offset values for use in automated wire insertion machine 100 of FIG. 1 is illustrated. More specifically, example plug map 300 includes a first set of cavity locations 310 (shown as solid circles in FIG. 3) that correspond to original cavity locations for electrical connector 112 (FIG. 1). Each of the original cavity locations (i.e., each of the first set of cavity locations 310) corresponds to spatial coordinates at which automated wire insertion machine 100 attempts to insert a wire. Plug map 300 further includes a second set of cavity locations 320 (shown as dashed circles in FIG. 3) that are rotationally offset (i.e., angular offset) about center point 330 relative to the first set of cavity locations 310. Each of the angular offset cavity locations (i.e., each of the second set of cavity locations 320) corresponds to spatial coordinates at which automated wire insertion machine 100 attempts to insert a wire in accordance with example embodiments as will be described in detail hereinbelow.

Figure 4:
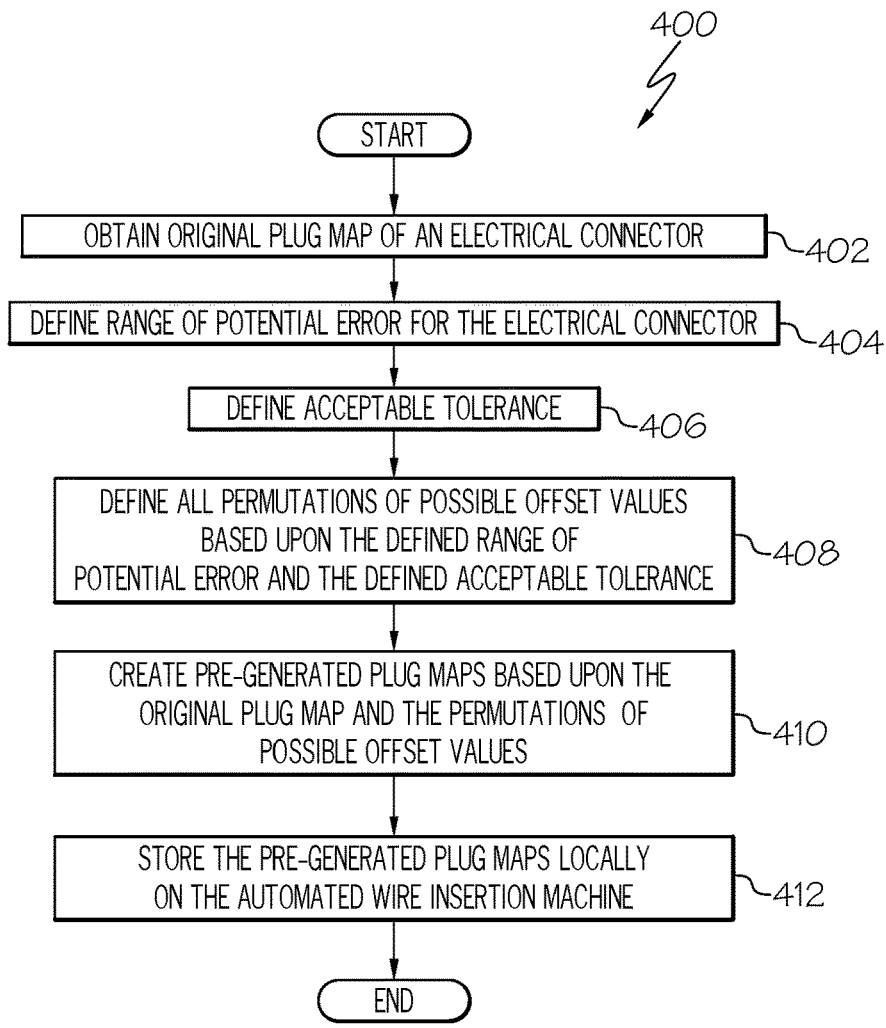
FIG. 4 is a flow diagram depicting an example method of operating the example computer system of FIG. 2 to pre-generate plug maps having offset values in accordance with an embodiment.

Referring to FIG. 4, flow diagram 400 depicts an example method of operating the example computer system of FIG. 2 to pre-generate plug maps having offset values in accordance with an embodiment. In block 402, an original plug map of an electrical connector, such as electrical connector 112 shown in FIG. 1, is obtained. The original plug map contains data that represents spatial coordinates corresponding to the centroid of each of grommet cavity locations of an ideally-manufactured electrical connector. This data can be obtained, for example, from the manufacturer of electrical connector 112. The process then proceeds to block 404.

In block 404, a range of potential rotational error for electrical connector 112 is defined. For example, the range of potential rotational error may be defined as ±3.0 degrees. In block 406, an acceptable rotational tolerance is defined. For example, the rotational tolerance may be defined as 0.1 degrees. The process then proceeds to block 408.

In block 408, all permutations of possible rotational offset values are calculated and defined based upon the range of potential error defined in block 404 and the acceptable rotational tolerance defined in block 406. Then, in block 410, plug maps having offset values (such as plug map 300 having offset values shown in FIG. 3) are created based upon the original plug map obtained in block 402 and the permutations of possible rotational offset values defined in block 408. Given the example range of potential rotational error of ±3.0 degrees and the example acceptable rotational tolerance of 0.1 degrees, this would result in sixty different plug maps with offset values (i.e., offset values of ±0.1°; ±0.2°; ±0.3° . . . ±2.8°; ±2.9°; ±3.0°).

As an example, new X coordinate portion of a coordinate pair is equal to $\cos(\theta)X-\sin(\theta)Y$. Each new Y coordinate portion of a coordinate pair is equal to $\sin(\theta)X+\cos(\theta)Y$. The angle $\theta$ is defined as the angle between zero and 360 degrees, or between zero and $2\pi$ radians. Thus, in this example, there are a total of sixty-one plug maps (i.e., the original plug map and the sixty plug maps with offset values) associated with electrical connector 112. The process then proceeds to block 412.

In block 412, the total of sixty-one plug maps (i.e., the original plug map and the sixty pre-generated plug maps with offset values) associated with electrical connector 112 are stored locally in data storage unit 104 of automated wire insertion machine 100. It is conceivable that original plug maps and corresponding plug maps with offset values associated with other electrical connectors be stored locally in data storage unit 104 of automated wire insertion machine 100. The process then ends.

Figure 5:
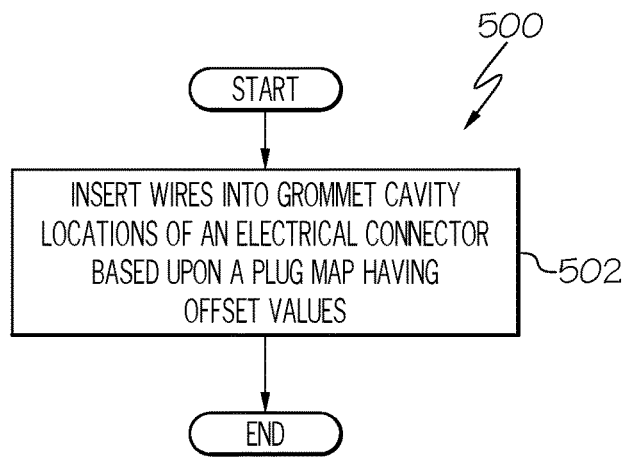
FIG. 5 is a flow diagram depicting an example method of operating the example automated wire insertion machine of FIG. 1 in accordance with an embodiment.

Referring to FIG. 5, flow diagram 500 depicts an example method of operating the example automated wire insertion machine 100 of FIG. 1 in accordance with an embodiment. In block 502, wires are inserted into grommet cavity locations 110 of electrical connector 112 (FIG. 1) based upon a plug map having offset values that is stored in data storage unit 104 of automated wire insertion machine 100. The process then ends.

Figure 6:
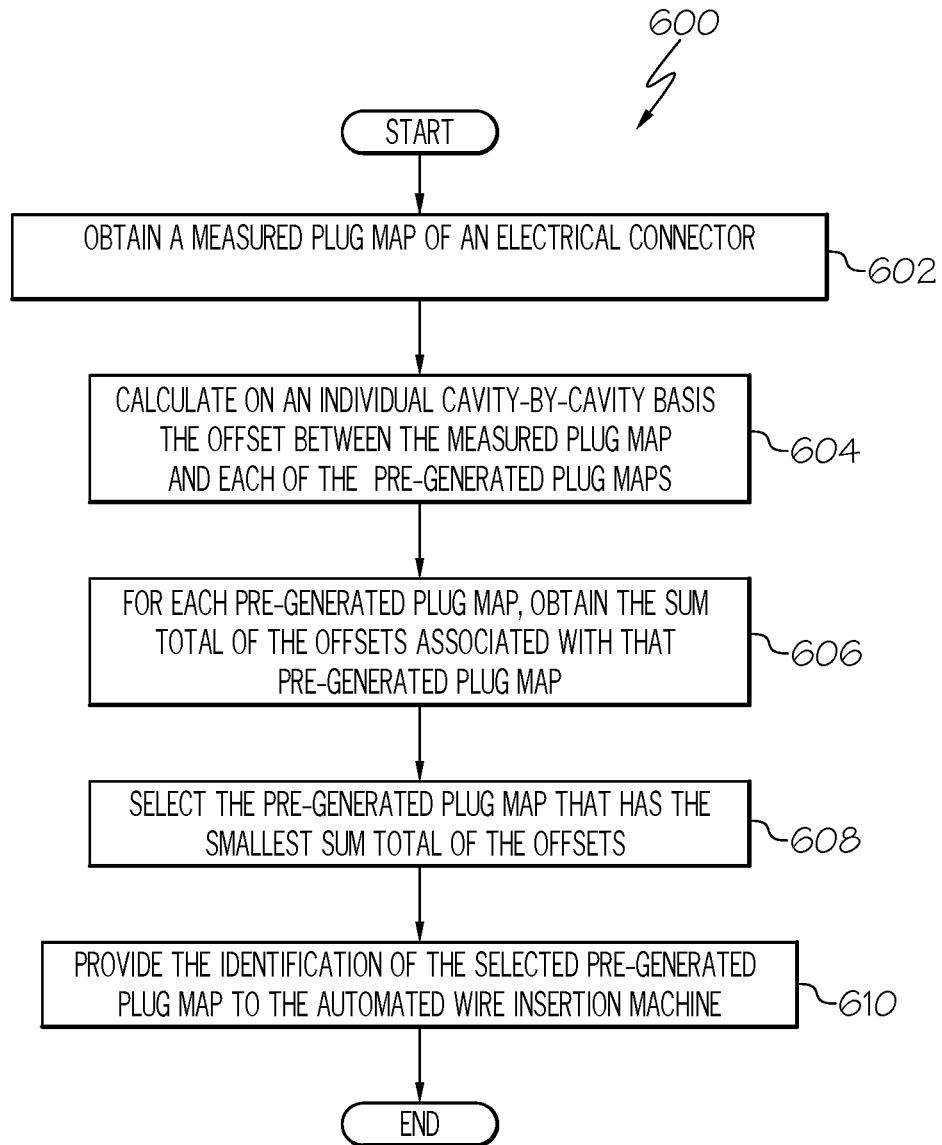
FIG. 6 is a flow diagram depicting an example method of operating the computer system of FIG. 2 to provide a selected pre-generated plug map having offset values for the automated wire insertion machine of FIG. 1.

Referring to FIG. 6, flow diagram 600 depicts an example method of operating computer system 200 of FIG. 2 to provide a selected pre-generated plug map having offset values for automated wire insertion machine 100 of FIG. 1. In this example embodiment, the original plug map and the plug maps with offset values that were pre-generated in FIG. 4 are also stored in data storage unit 202 of computer system 200 (FIG. 2). Flow diagram 600 shows a process to select the most closely matching pre-generated plug map.

In block 602, a measured plug map of electrical connector 112 shown in FIG. 1 is obtained. The measured plug map contains data that represents spatial coordinates corresponding to the centroid of each of grommet cavity locations 110 of electrical connector 112. This data can be obtained, for example, by a vision system (not shown) that captures an image of electrical connector 112. An example vision system that can be used to provide a measured plug map comprises model In-Sight 5605 manufactured by Cognex located in Natick, Mass., U.S.A. Vision software of vision system is trained to locate the true location of the centroid of each individual cavity. The true location of each cavity is provided in the same Cartesian coordinate system (X, Y) of the original plug map. The process then proceeds to block 604.

In block 604, the offset between the measured plug map and each of the pre-generated plug maps is calculated on an individual cavity-by-cavity basis. Then, in block 606, for each pre-generated plug map, the sum of offset values associated with that particular pre-generated plug map is calculated. More specifically, the distance formula represented as follows is used to calculate each offset value.

$$\text{Offset Value} = [(X_2 - X_1)^2 + (Y_2 - Y_1)^2]^{1/2}$$

where $(X_1, Y_1)$ are the spatial coordinates of a point from the measured plug map; and $(X_2, Y_2)$ are the spatial coordinates of a point from a pre-generated plug map.

Each offset value is representative of the distance away from the true location of the associated grommet cavity location of electrical connector 112. This process is repeated for each of the cavities for each pre-generated plug map. A sum of all offset values associated with each pre-generated plug map is then obtained. Thus, sixty sum of offset values are provided. The process then proceeds to block 608.

In block 608, the pre-generated plug map with the smallest sum of offset values is selected. This selected pre-generated plug map is the closest match (i.e., the "best match" or "best fit") to the measured plug map obtained in block 602. Then, in block 610, the selected pre-generated plug map of block 608 is identified, for example, by its plug map number. The plug map number is provided to automated wire insertion machine 100 (FIG. 1) to allow machine 100 to retrieve the corresponding pre-generated plug map from data storage unit 104 to insert wires into grommet cavity locations 110 of electrical connector 112 based on the identified pre-generated plug map. The process of flow diagram 600 of FIG. 6 then ends.

Figure 7:
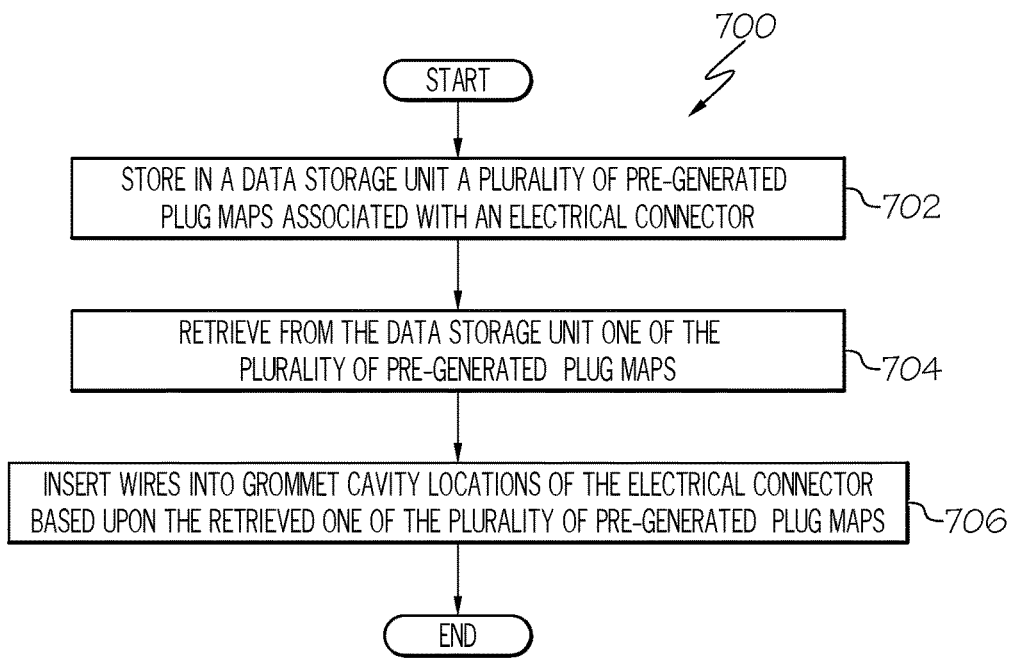
FIG. 7 is a flow diagram depicting an example method of operating the automated wire insertion machine of FIG. 1 in accordance with another embodiment.

Referring to FIG. 7, flow diagram 700 depicts an example method of operating the automated wire insertion machine 100 of FIG. 1 in accordance with another embodiment. In block 702, a plurality of pre-generated plug maps associated with electrical connector 112 is stored in data storage unit 104 of automated wire insertion machine 100. Then, in block 704, one of the pre-generated plug maps stored in data storage unit 104 is retrieved. In block 706, wires are inserted into grommet cavity locations 110 of electrical connector 112 based upon the pre-generated plug map retrieved in block 704. The process then ends.

Figure 8:
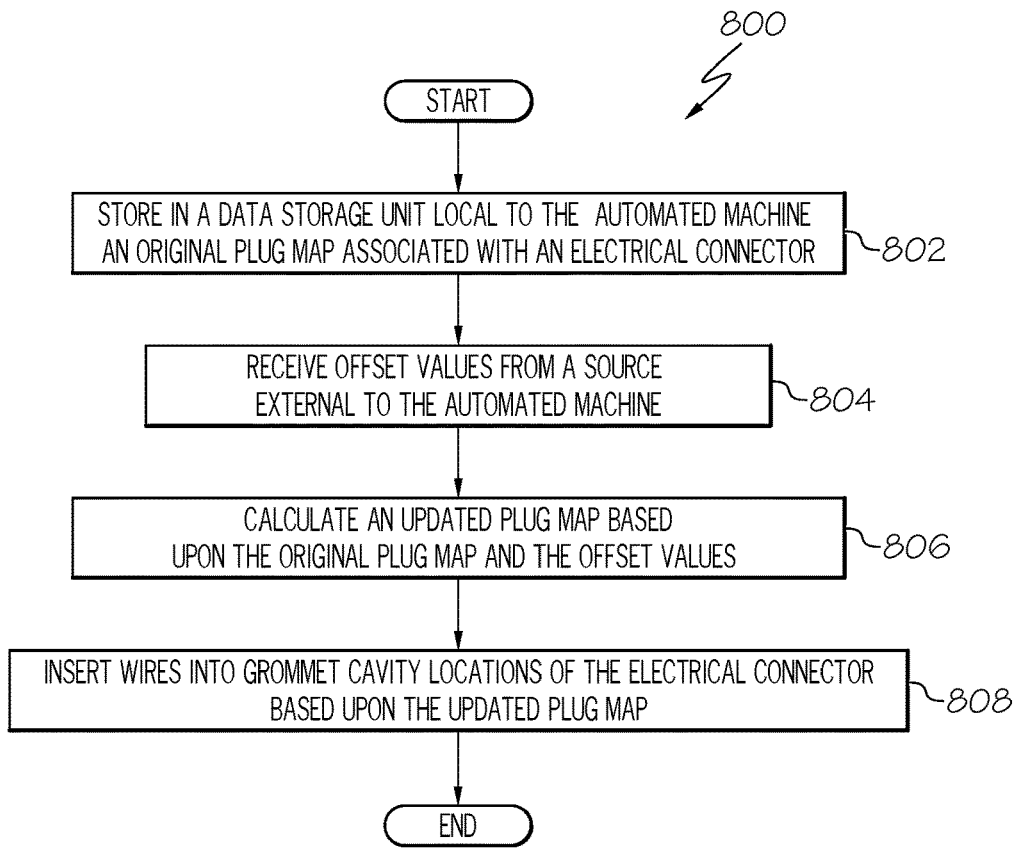
FIG. 8 is a flow diagram depicting an example method of operating the automated wire insertion machine of FIG. 1 in accordance with yet another embodiment.

Referring to FIG. 8, flow diagram 800 depicts an example method of operating the automated wire insertion machine of FIG. 1 in accordance with yet another embodiment. In block 802, an original plug map associated with electrical connector 112 is stored locally in data storage unit 104 of automated wire insertion machine 100. Then, in block 804, offset values are received from a source external to automated wire insertion machine 100. The offset values may be obtained by taking the difference for each point between an original plug map and a measured plug map, for example. The measured plug map can be obtained by a vision system, for example. The process proceeds to block 806.

In block 806, an updated plug map is calculated based upon an original plug map stored in data storage unit 104 and the offset values received in block 804. The updated plug map is stored in data storage unit 104. Then, in block 808, wires are inserted into grommet locations 110 of electrical connector 112 based upon the updated plug map of block 806. The process of flow diagram 800 of FIG. 8 then ends.

It should be apparent that the above-described plug maps with offset values enable automated insertion of wires into grommet cavity locations of an electrical connector to compensate for manufacturing tolerances associated with the electrical connector. Plug maps with offset values are needed to enable automated wire insertion because grommet cavity locations of electrical connectors do not have exact locations and dimensions. The offset values are needed to avoid collision of a wire with the electrical connector when the wire is being inserted. Wires are inserted with a much lower risk of a failed wire insertion.

It should also be apparent that the stored permutations of offset values enable a fast robotic insertion of wires into grommet cavity locations of the electrical connector. While a large number of pre-generated plug maps with offset values would be difficult to search through manually, it would be relatively easy to use a processing unit to search through the large number of pre-generated plug maps with offset values.

Although the above description describes rotational offset values, it is conceivable that translational offset values, or a combination of rotational offset values and translational offset values be used.

Also, although the above description describes sixty plug maps having offset values being pre-generated, it is conceivable that any number of plug maps having offset values could be pre-generated. For examples, the number of plug maps having offset values could be hundreds, thousands, or even tens of thousands, depending upon the range of potential error and the acceptable tolerance for the particular application.

Further, although the above describes plug maps having offset values being used for automated wire insertion in grommet cavity locations of MIL-spec type of electrical connectors, it is conceivable that plug maps having offset values be used for automated insertion in grommet cavity locations of non-MIL-spec type of electrical connectors.

Although the above-description describes methods for facilitating automated wire insertion into grommet cavity locations of electrical connectors for airplane parts in the aviation industry in accordance with FAA regulation, it is contemplated that the methods may be implemented to facilitate automated wire insertion for any type of electrical connector in any industry in accordance with the applicable industry standards.

Aspects of disclosed embodiments may be implemented in software, hardware, firmware, or a combination thereof. The various elements of the system, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

Although various aspects of disclosed embodiments have been shown and described, modifications may occur to those skilled in the art upon reading the specification. The present application includes such modifications and is limited only by the scope of the claims.

What is claimed is:

1. A method of operating an automated machine for inserting wires into grommet cavity locations of an electrical connector to compensate for manufacturing tolerances associated with the electrical connector, the method comprising:
   generating a plurality of pre-generated plug maps based upon an original plug map of the grommet cavity locations of the electrical connector, the generating comprising:
      defining a range of potential error of the grommet cavity locations of the electrical connector that comprises at least one of a potential rotational error and a potential translational error;
      defining an acceptable tolerance of the grommet cavity locations of the electrical connector that comprises at least one of an acceptable rotational tolerance and an acceptable translational tolerance; and
      calculating all permutations of possible offset values of the grommet cavity locations of the electrical connector based on the range of potential error and the acceptable tolerance, thereby creating the plurality of pre-generated plug maps; and
   inserting the wires into the grommet cavity locations of the electrical connector based upon one pre-generated plug map of the plurality of pre-generated plug maps.

2. The method according to claim 1 further comprising:
   selecting from the plurality of pre-generated plug maps the closest matching pre-generated plug map of the plurality of pre-generated plug maps for the electrical connector based upon offset values associated with each of the plurality of pre-generated plugs maps, wherein the selected pre-generated plug map corresponds to the pre-generated plug map used to insert wires into grommet cavity locations of the electrical connector.

3. The method according to claim 2 wherein the selecting comprises:
   obtaining a measured plug map that represents spatial coordinates corresponding to a centroid of each grommet cavity location of the electrical connector;
   calculating second offset values based on the grommet cavity locations in the measured plug map relative to the grommet cavity locations in a pre-generated plug map; and
   calculating a sum of the offset values between the measured plug map and a generated plug map.

4. The method according to claim 3 wherein:
   the calculating of the sum of offset values is performed for at least two pre-generated plug maps of the plurality of pre-generated plug maps; and
   the selecting comprises determining which pre-generated plug map of the plurality of pre-generated plug maps has the smallest sum of offset values.

5. The method according to claim 3 wherein the obtaining the measured plug map comprises using a vision system to capture an image of the electrical connector.

6. The method according to claim 1 wherein the calculating comprises calculating at least one of rotational offset values and translational offset values.

7. The method according to claim 1 further comprising:
   inserting wires into grommet cavity locations of a different type of electrical connector based upon a different pre-generated plug map having different offset values.

8. The method according to claim 1 wherein the method is performed by a computer having a memory executing one or more programs of instructions which are tangibly embodied in a program storage medium readable by the computer, and wherein the computer controls the automated machine for inserting the wires into the grommet cavity locations of the electrical connector.

9. The method according to claim 1 further comprising storing in a data storage unit a plurality of plug maps associated with the electrical connector.

10. The method according to claim 9 wherein the plurality of plug maps comprises the original plug map and at least one pre-generated plug map of the plurality of pre-generated plug maps.

11. The method according to claim 9 wherein the plurality of plug maps comprises plug maps associated with a different type of electrical connector.

12. The method according to claim 9 wherein the storing in the data storage unit the plurality of plug maps associated with the electrical connector comprises:
   storing in a data storage unit that is located within the automated wire insertion machine the plurality of plug maps associated with the electrical connector.

13. The method according to claim 12 further comprising receiving offset values from a source external to the automated wire insertion machine.

14. The method according to claim 9 further comprising retrieving from the data storage unit one of the plurality of plug maps.

15. The method according to claim 14 wherein the inserting the wires into the grommet cavity locations of the electrical connector based upon the one pre-generated plug map comprises inserting wires into the grommet cavity locations based upon the retrieved one of the plurality of plug maps.

16. The method according to claim 1 wherein the calculating comprises calculating offset values on an individual cavity-by-cavity basis.

17. The method according to claim 1 wherein the generating the plurality of pre-generated plug maps comprises generating at least sixty pre-generated plug maps.

18. A method of operating an automated machine for inserting wires into grommet cavity locations of an electrical connector to compensate for manufacturing tolerances associated with the electrical connector, the method comprising:

generating a plurality of pre-generated plug maps based upon an original plug map of the grommet cavity locations of the electrical connector, the generating comprising:

defining a range of potential error of the grommet cavityt locations of the electrical connector that comprises a potential rotational error and a potential translational error;

defining an acceptable tolerance of the grommet cavity locations of the electrical connector that comprises an acceptable rotational tolerance and an acceptable translational tolerance; and calculating rotational offset values and translational offset values of the grommet cavity locations of the electrical connector based on the range of potential error and the acceptable tolerance, thereby creating the plurality of pre-generated plug maps; and inserting the wires into the grommet cavity locations of the electrical connector based upon one pre-generated plug map of the plurality of pre-generated plug maps.

19. The method according to claim 18 wherein the method is performed by a computer having a memory executing one or more programs of instructions which are tangibly embodied in a program storage medium readable by the computer, and wherein the computer controls the automated machine for inserting the wires into the grommet cavity locations of the electrical connector.

20. The method according to claim 18 wherein the calculating comprises calculating offset values on an individual cavity-by-cavity basis.

* * * * *